United States Patent [19]

Duh

[11] Patent Number: 4,963,644

[45] Date of Patent: Oct. 16, 1990

[54] PROCESS FOR CRYSTALLIZATION OF POLYETHYLENE NAPHTHALATE

[75] Inventor: Ben Duh, Tallmadge, Ohio

[73] Assignee: The Goodyear Tire & Rubber Company, Akron, Ohio

[21] Appl. No.: 408,354

[22] Filed: Sep. 18, 1989

[51] Int. Cl.$^5$ .............................................. C08G 63/88
[52] U.S. Cl. .................... 528/272; 528/298; 528/483; 528/502; 528/503
[58] Field of Search ............... 528/272, 298, 483, 502, 528/503

[56] References Cited

U.S. PATENT DOCUMENTS

| | | | |
|---|---|---|---|
| 4,327,205 | 4/1982 | Kato et al. | 528/128 |
| 4,374,975 | 2/1983 | Duh | 528/272 |
| 4,755,587 | 7/1988 | Rinehart | 528/272 |
| 4,792,573 | 12/1988 | Cohn | 521/604 |
| 4,849,497 | 7/1989 | Scannapielo | 528/272 |
| 4,876,326 | 10/1989 | Rinehart | 528/272 |

*Primary Examiner*—John Kight, III
*Assistant Examiner*—Sam A. Acquah
*Attorney, Agent, or Firm*—Alvin T. Rockhill

[57] ABSTRACT

High molecular weight polyester resins are sometimes produced from low molecular weight polyester prepolymers having the same composition by solid state polymerization. Polyester prepolymers are generally converted from the amorphous state to the crystalline state prior to solid state polymerization in order to raise their sticking temperature. This is done to keep the polyester prepolymer from sticking together as a solid mass in the solid state polymerization reactor. Such polyester prepolymers are traditionally crystallized by simply heating them to an elevated temperature at which crystallization occurs. However, polyethylene naphthalate prepolymer cannot be crystallized by utilizing this simply traditional approach. This inventions discloses a process for crystallizing amorphous polyethylene naphthalate prepolymer which comprises: (1) heating the amorphous polyethylene naphthalate prepolymer to a temperature which is within the range of about 80° C. to about 140° C. in the presence of a stream of an inert gas or under a vacuum to devolatilize the amorphous polyethylene naphthalate prepolymer; and (2) subsequently heating the devolatilized polyethylene naphthalate prepolymer to a temperature which is within the range of about 150° C. to about 260° C. while providing agitation to produce the crystallized polyethylene naphthalate prepolymer.

19 Claims, No Drawings

PROCESS FOR CRYSTALLIZATION OF POLYETHYLENE NAPHTHALATE

BACKGROUND OF THE INVENTION

High molecular weight polyesters are commonly produced from low molecular weight polyesters of the same composition by solid state polymerization. The low molecular weight polyesters which are used in such solid state polymerizations are generally prepared by conventional melt polymerizations. Solid state polymerization is generally considered advantageous in that the handling of high molecular weight ultra-high viscosity molten polymers during the polymerization phase is eliminated. Thermal degradation is also essentially avoided during the solid state portion of the polymerization.

The low molecular weight polyester prepolymers utilized in solid state polymerizations are generally in the form of pellets or chips. Such pellets can vary greatly in size; however, as a general rule, the smaller the size of the pellets of polyester prepolymer the faster the solid state polymerization will proceed. Very fast rates of solid state polymerization can be attained by utilizing polyester prepolymers which are in the form of porous pills as described in U.S. Pat. No. 4,755,587 to Rinehart.

Most thermoplastic polyesters, including polyethylene terephthalate (PET) and polyethylene naphthalate (PEN), produced by melt-phase polymerization are almost completely amorphous in nature. Such amorphous polyester prepolymers which are prepared by melt polymerization are normally converted from the amorphous state to the crystalline state prior to solid state polymerization to raise their sticking temperature. This is done to keep pellets or chips of the polyester prepolymer being solid state polymerized from sticking together as a solid mass.

When an amorphous polyester is heated from ambient temperature to above its glass transition temperature (Tg), it will become sticky before it starts to crystallize. The sticking temperature of an amorphous polyester is usually about 20° C. above its Tg. The crystallization rate of the polyester will not be fast enough to be practical until its temperature is further raised to about 30° C. above its sticking temperature. To achieve the maximum crystallization rate, the temperature of the polyester must be raised even higher. For example, PET has a Tg of 74° C. and a sticking temperature of about 95° C. The crystallization rate of PET is rather low until the temperature is raised to above 125° C. and in practice, PET is usually crystallized at temperatures between 150° C. and 190° C.

PEN is a relatively new polyester with promising properties for fiber and packaging applications. PEN has a Tg of about 118° C. and a crystalline melting point (Tm) of 268° C. It exhibits a crystallization peak between 180° C. and 220° C. Its sticking temperature is about 140° C. when in the amorphous state. According to conventional wisdom, the best crystallization temperature range for PEN would be between 180° C. and 220° C.

In the crystallization process, the polyester must undergo a sticky stage. This takes place in the period between the time the polyester temperature exceeds the sticking temperature and the time the polyester becomes well crystallized. Therefore, commercial-scale crystallizers for continuous crystallization of polyesters must provide vigorous agitation to prevent agglomeration or lumping of the polyester pellets. Two types of continuous crystallizers have been widely used, namely, agitated vessels and fluidized beds.

Heretofore, in the continuous crystallization process of particulate polyesters, PET in particular, the polyester pellets at ambient temperature without any pretreatment are directly charged into the crystallizer in which the heat transfer medium (e.g., hot air, hot nitrogen, or hot oil) maintains a suitable crystallization temperature. Under appropriate operating conditions, the polyester pellets can be crystallized without lumping or agglomeration.

However, when PEN pellets are exposed to the crystallization conditions as determined by conventional wisdom, the pellets undergo a sudden and rapid expansion as they are heated to near the crystallization temperature. The puffed up skins of the pellets are very sticky and, within seconds, the pellets agglomerated tightly into big lumps, vigorous agitation notwithstanding. This indicates that the conventional crystallization process is not suitable for commercial crystallization of PEN.

SUMMARY OF THE INVENTION

To determine the cause for the sudden expansion of PEN pellets during crystallization, a sample PEN pellet was scanned on DTA. Its DTA thermogram exhibited an endotherm near the onset of the crystallization exotherm. The endotherm is believed to arise from the sudden vaporization and/or release of volatiles, including gases, trapped inside the pellet as the PEN is softened near its crystallization temperature. This phenomenon explains the sudden expansion of PEN pellets as they are exposed to standard crystallization temperatures of 180° C. to 220° C. It has been determined that molten PEN is quite unstable. Degradation of PEN could generate water, ethylene glycol, acetaldehyde and the like. Because of the very high melt viscosity of PEN, these by-products are difficult to remove during pelletizing. Furthermore, PEN is often pelletized under nitrogen pressure. In this case, nitrogen could also be trapped inside the pellets. PET is much more stable in its melt state and its melt viscosity is much lower than that of PEN. The amounts of by-products generated in PET are relatively small and are more easily removed during pelletizing. Therefore, very little volatiles are trapped inside PET pellets to cause lumping and sticking problems during crystallization.

It has been unexpectedly discovered that the severe lumping and stocking problem of PEN pellets during crystallization can be forestalled by slowly removing the volatiles trapped inside the pellets at temperatures below its sticking temperature prior to the crystallization step. This invention discloses an efficient and stable process for continuous crystallization of PEN pellets. This process incorporates a devolatilization step before the crystallization step.

The subject invention more specifically reveals a process for crystallizing amorphous polyethylene naphthalate prepolymer which comprises (1) heating the amorphous polyethylene naphthalate prepolymer to a temperature which is within the range of about 80° C. to about 140° C. in the presence of a stream of an inert gas or under a vacuum to devolatilize the amorphous polyethylene naphthalate prepolymer; and (2) subsequently heating the devolatilized polyethylene naphthalate prepolymer to a temperature which is within the range of about 150° C. to about 260° C. while providing agitation to produce the crystallized polyethylene naphthalate prepolymer.

The present invention further reveals a process for solid state polymerizing polyethylene naphthalate prepolymer into high molecular weight polyethylene naphthalate resin comprising: (1) devolatilizing the polyethylene naphthalate prepolymer at a temperature which is within the range of about 80° C. to about 140° C. in the presence of a stream of an inert gas or under a vacuum; (2) crystallizing the devolatilized polyethylene naphthalate prepolymer by heating it to a temperature which is within the range of about 150° C. to about 260° C. while providing agitation: and (3) subsequently heating the crystallized polyethylene naphthalate prepolymer to a temperature from about 50° C. to about 1° C. below its sticking temperature for a period of time sufficient to produce the high molecular polyethylene naphthalate resin.

DETAILED DESCRIPTION OF THE INVENTION

The polyethylene nap naphthalate (PEN) prepolymer utilized in accordance with the present invention is typically prepared by standard melt polymerization techniques. Such melt polymerizations result in the formation of PEN which is essentially amorphous in nature. By this we mean that the PEN is virtually totally amorphous even though it may contain small regions where crystallinity exists. The PEN is generally produced by melt polymerizing ethylene glycol with a naphthalene dicarboxylic acid monomer, such as 2,6-naphthalene dicarboxylic acid. However, it is also possible to prepare PEN prepolymer by polymerizing ethylene glycol with a diester of a naphthalene dicarboxylic acid. It is also contemplated that small amounts of other diols and diacids may be utilized to modify the PEN.

The PEN prepolymer utilized in accordance with this invention typically has an initial starting intrinsic viscosity (IV) of at least about 0.2 dl/g as measured in a 60:40 phenol:tetrachloroethane solvent system at a temperature of 30° C. and at a concentration of 0.4 g/dl. The amorphous PEN prepolymer will preferably have an initial or starting IV of from about 0.3 to about 0.7 dl/g. The amorphous PEN prepolymer will more preferably have an initial IV of about 0.4 to about 0.5 dl/g.

In the first step of the crystallization procedure, the amorphous PEN prepolymer is heated to a temperature within the range of about 80° C. to about 140° C. in the presence of a stream of an inert gas or under a vacuum to devolatilize the amorphous PEN. This devolatilization procedure is preferably conducted at a temperature which is within the range of about 115° C. to about 137° C. It is more preferred for the devolatilization to be done at a temperature within the range of 120° C. to 135° C.

The inert gas utilized in the devolatilization procedure can be any gas which does not react with the PEN prepolymer. Since the PEN prepolymer is relatively stable at the devolatilization temperature, air can be used as the inert gas. It is, of course, also possible to utilize nitrogen, or a noble gas such as helium or neon in the devolatilization procedure. Even though it is possible to carry out the devolatilization step under a vacuum, it is normally preferred to carry out the devolatilization in the presence of a stream of an inert gas because the inert gas can be preheated to the devolatilization temperature to provide improved heat transfer. The devolatilization step is carried out for a period of time which is sufficient to remove most of the volatile materials, such as water, ethylene glycol, acetaldehyde, etc. from the PEN prepolymer. It is, of course, desirable to remove virtually all of the volatile compounds from the amorphous PEN prepolymer.

Since the devolatilization procedure is carried out at a temperature below the sticking temperature of the amorphous PEN prepolymer, it is not necessary to provide agitation during the devolatilization step. Accordingly, a hopper type devolatilizer can be utilized wherein the amorphous PEN prepolymer pellets or chips are continuously charged into the top of the hopper and are allowed to move through the hopper by gravity countercurrent to the flow of inert gas. The devolatilized pellets leaving the bottom of the hopper devolatilizer can then be continuously fed into a crystallizer.

The devolatilized PEN prepolymer is then heated to a temperature within the range of about 150° C. to about 260° C. for crystallization. It is normally preferred for the crystallization step to be done at a temperature which is within the range of about 180° C. to about 220° C. It is typically more preferred for the crystallization temperature to be within the range of 190° C. to 200° C. It is important for the crystallization step to be conducted while the PEN prepolymer is being agitated to prevent sticking. The requisite degree of agitation can be provided by utilizing a crystallizer which has a fluidized bed. In such fluidized bed crystallizers, an inert gas is typically allowed to flow through the crystallizer at a rate sufficient to maintain the prepolymer chips or pellets in the fluidized state. It is, of course, also possible to perform the crystallization step in an agitated vessel which provides sufficient agitation so as to prevent sticking or agglomeration of the PEN prepolymer pellets or chips.

The amount of time required for the devolatilization step and the crystallization step will depend upon the temperatures utilized. Higher temperatures naturally require shorter periods of time to achieve requisite degrees of devolatilization and crystallization. For example, at a temperature of 115° C. the time required for devolatilization is about four hours. At a temperature of 130° C. only about two hours is required for devolatilization. The optimum period of time required for devolatilization and crystallization will also be somewhat dependent upon the equipment utilized and the size and shape of the pellets or chips. The time required for devolatilization in a continuous process will typically be within the range of 15 minutes to 10 hours and will more typically be within the range of 30 minutes to 4 hours. The time required for crystallization will typically be within the range of about 1 minute to about 4 hours. In a continuous process, the crystallization step will normally take about 2 minutes to about 30 minutes. These devolatilization and crystallization steps can, of course, be carried out as batch or continuous operations.

After the PEN prepolymer has been crystallized, it can be solid state polymerized in a batch or continuous process. Suitable solid state polymerization temperatures can range from a temperature just above the threshold temperature of the polymerization reaction up to a temperature within a few degrees of the sticking temperature of the PEN prepolymer which can be well below its melting point.

The solid state polymerization temperature utilized will typically be from about 1° C. to about 50° C. below the sticking temperature of the crystallized PEN prepolymer. The optimum solid state reaction temperature will differ somewhat for polymers of different molecular weights. As a general rule, the optimum solid state polymerization temperature for the PEN prepolymer will be from about 5° C. to about 20° C. below its sticking temperature. For example, in the solid state polymerization of crystalline PEN, the temperature employed normally ranges from about 210° C. to about 265° C. Generally, the crystalline PEN prepolymer will be solid state polymerized at a temperature of from about 230° C. to about 265° C. In most cases, PEN prepolymer will be solid state polymerized at a temperature of from 240° C. to 260° C.

As the solid state polymerization of the PEN prepolymer proceeds, its sticking temperature can increase. Thus, the solid state polymerization temperature can be incrementally increased during the course of the polymerization. For example, U.S. Pat. No. 3,718,621, describes such a technique in the solid state polymerization of PET prepolymer.

The solid state polymerization is conducted under a vacuum or in the presence of a stream of an inert gas. Normally such solid state polymerizations are conducted in the presence of an inert gas stream. It is highly desirable for the inert gas to flow uniformly throughout the solid state polymerization zone which is filled with the polyester prepolymer which is being polymerized. In order to help insure that the inert gas flows homogeneously or uniformly through the solid state polymerization zone without bypassing certain areas in it, a device for dispersing the inert gas is generally used. Thus, a good polymerization reactor will be designed in such a way that the inert gas will flow homogeneously through the polyester prepolymer in it. It should be noted that the inert gas actually flows around the pellets or chips of polyester prepolymer as it streams through the solid state polymerization zone.

Some suitable inert gases for use in the solid state polymerization process of this invention include nitrogen, carbon dioxide, helium, argon, neon, krypton, zeon, and certain industrial waste gases. Various combinations or mixtures of different inert gases can also be used. In most cases nitrogen will be used as the inert gas. In a continuous process, the mass flow ratio of PEN prepolymer to nitrogen gas will be within the range of about 1:0.25 to about 1:1.

The solid state polymerization reactor employed can have a fixed bed, a static bed, a fluidized bed, or a moving bed. In most cases, it is preferred to utilize a cylindrical polymerization reactor wherein the PEN prepolymer flows through the reactor for the desired residence time. Such cylindrical reactors have a substantially uniform cross-section and a sufficient height to allow the PEN prepolymer to flow by reason of the force of gravity from the top to the bottom of the reactor in the desired residence time. In other words, the PEN prepolymer moves from the top to the bottom of such a cylindrical polymerization reactor in a partially dammed state. The rate of flow through such a reactor can be controlled by regulating discharge at the bottom of the reactor. It is generally preferred to allow an inert gas to flow countercurrently (upwardly) through the reactor at a gas velocity well below the turbulence point so that the pellets or chips of PEN prepolymer are not fluidized (always remain in contact with each other). The pellets or chips of PEN prepolymer remain in substantially the same physical form throughout the solid state polymerization process.

The PEN prepolymer will be solid state polymerized for a time sufficient to increase its molecular weight or IV to that of the high molecular weight PEN resin desired. It will be desirable for the high molecular weight PEN resin being prepared to have an IV of at least 0.5 dl/g. In most cases the high molecular weight resin will have an IV of at least about 0.65 dl/g and for some applications will preferably have an IV of at least about 0.8 dl/g. The polymerization time needed will normally range from about 1 to about 36 hours and in most cases will range from 6 to 24 hours.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1

PEN pellets with an IV of 0.52 dl/g, a density of 1.328 g/cc, and a particle size of 1.5 g/100 pellets were produced by a melt-phase polymerization process. Samples of these PEN pellets were used to conduct crystallization tests. The crystallizer used in the experiment was an agitated fluidized bed made of a glass column with 1 inch ID and 20 inch long. A ⅛ inch diameter metal rod was used as the agitator to help break up agglomeration. During operating, the fluidized bed was immersed in a transparent hot oil bath, whose temperature was controlled at 200° C., and a stream of hot air, preheated to 200° C., was passed through the bottom of the bed at a flow rate of 75 cubic feet per hour (CFH) to fluidize the PEN pellets in the bed.

Although the crystallizer used is a simple batch fluidized bed, it has been found that it is capable of projecting the difficulty or ease with which polyester pellets are crystallized in commercial scale continuous crystallizers.

Five grams of untreated PEN pellets were dropped into the fluidized bed. Within 1 minute, the pellets suddenly puffed up and agglomerated into tight lumps that could not be broken up with the agitator. Although the pellets shrank somewhat as the puffed skins burst during crystallization, they were still considerably enlarged and badly distorted with open voids after crystallization.

EXAMPLE 2

A small scale static bed devolatilizer was set up next to the fluidized bed crystallizer used in Example 1 to study the effect of devolatilization treatment on the crystallization of PEN pellets. The devolatilizer was made of a glass column with 1 inch ID and 20 inches long. In operation, the devolatilizer was immersed in a thermostated hot oil bath with a stream of hot air, preheated to the hot oil temperature, passing through the bottom at 12 CFH.

For the first experiment, the hot oil and the hot air temperatures for the devolatilizer were controlled at 100° C. Five grams of PEN pellets were charged into the devolatilizer. One hour later, these PEN pellets were transferred into the fluidized bed crystallizer whose temperature had been controlled at 200° C. The pellets still puffed up and burst and quickly agglomerated in the crystallizer, although the lumps formed were not as tight as that formed by the untreated pellets.

In the second experiment, another 5 grams of PEN pellets were treated in the devolatilizer at the same temperature for 2 hours before being transferred into the crystallizer. This time the pellets still puffed up, but not enough to burst. The lumps formed could be broken up into bead-like particles.

In the third experiment, the devolatilization time was increased to 3 hours. Inside the crystallizer, the pellets expanded and distorted to some extent and still had a high sticking tendency, but the lumps formed during crystallization could be broken loose with the agitator. The crystallized pellets obtained were slightly expanded and distorted.

In the fourth experiment, the devolatilization time was increased to 6 hours. With this pretreatment, the pellets did not expand or distort in the crystallizer. There was only a mild sticking tendency during crystallization and agglomeration was readily prevented with agitation. Within 2 minutes, the pellets were well crystallized and fluidized nicely. Five minutes later, the crystallized pellets were removed from the crystallizer and cooled to room temperature. The density of this crystallized PEN was determined to be 1.351 g/cc.

EXAMPLE 3

The experiments in this example were similar to those in Example 2 except the devolatilization conditions were changed to determine the effect of the devolatilization temperature on the devolatilization time required for the most stable crystallization operation.

When the devolatilization temperature was increased to 115° C. and 130° C., the required devolatilization times were reduced to 4 and 2 hours, respectively.

A small sample of PEN pellet devolatilized at 130° C. for 2 hours was scanned on DTA. The pretreated PEN pellet did not exhibit an endotherm as the untreated PEN pellet did near the onset of the crystallization exotherm, indicating that the volatiles trapped inside the pellet had been removed during devolatilization.

Example 1 shows that the conventional one-step process for continuous crystallization of polyesters is not suitable for crystallization of PEN pellets. Example 2 demonstrates that the lumping problem of PEN pellets can be prevented by subjecting PEN pellets to a devolatilization step prior to the crystallization step. Example 3 shows that the required devolatilization time decreases with increasing devolatilization temperature. It should be noted that the necessary devolatilization conditions required may vary depending on how the amorphous PEN is produced and pelletized.

Example 4

The apparatuses used in Example 2 were used to determine the rate and extent of crystallization of PEN. The same PEN pellets used in Example 1 were first devolatilized at 130° C. for 2 hours and then transferred into the crystallizer to crystallize at various temperatures for various periods of time. The densities of the crystallized PEN samples were determined. The density values are related to the degrees of crystallinity for PEN by the following equation:

$$\text{Fractional crystallinity} = (D_s - D_a)/(D_c - D_a)$$

where $D_s$=density of test sample (g/cc), $D_a$=density of amorphous sample=1.328 g/cc, $D_c$=density of PEN crystal=1.407 g/cc.

It was determined that PEN crystallizes rapidly at 200° C. and higher temperatures and slowly at temperatures below 170° C. It was also determined that the rate and the extent of crystallization of PEN increase with increasing crystallization temperature and time.

A multi-stage continuous crystallization process for PEN is contemplated. This crystallization process consists of one or more devolatilization steps and a crystallization step.

The devolatilizer is basically a continuous polymer heating and purging vessel. The maximum operating temperature of the devolatilizer is kept below the sticking temperature of the polyester so that no vigorous agitation is required for the devolatilization operation. The devolatilizing vessel may be operated with or without agitation depending on its configuration. The simplest devolatilizer may be a hopper type vessel with or without an agitator. Agitated horizontal vessels may also be used. In this case, only mild agitation is required to convey the polymer and to improve heat transfer. The purging gas may be nitrogen or air, dried or undried.

The crystallizer used in this improved process is similar to that used in the conventional crystallization process. It may be a continuous fluidized bed, or a horizontal vessel that provides vigorous agitation. Hot oil and/or gas are used as the heat transfer media. When a fluidized bed is used, nitrogen or air, dried or undried, may be used as the fluidizing as well as the heat transfer medium.

In this particular example, amorphous PEN pellets are continuously charged into a hopper type devolatilizer. A stream of hot air is passed through the bottom of the devolatilizer at 130° C. The PEN pellets move down the devolatilizer by gravity countercurrent to the hot air which heats and devolatilizes the pellets. The devolatilized pellets leaving the bottom of the devolatilizer enter a vibrating fluidized bed crystallizer. A stream of hot air is introduced through the bottom of the crystallizer to fluidize and heat the pellets as they move across the bed. The pellets are heated to the crystallization temperatures and crystallized quickly in the crystallizer. The pellets leaving the crystallizer will have developed a sufficient crystallinity for subsequent processing steps, such as drying, solid state polymerization, extrusion and injection molding, etc. A split stream of the exhaust hot air from the crystallizer may be used to heat the devolatilizer after being cooled to below the polymer sticking temperature by mixing with ambient air. The remaining exhaust hot air is recycled.

Although PET and other thermoplastic polyesters may be crystallized without difficulty by conventional single-stage crystallization process, the proposed multistage crystallization process may also be advantageously used to improve the efficiency and stability of the process.

There are many advantages associated with the process of this invention. As mentioned previously, if conventional crystallization techniques are employed, PEN pellets tend to expand and agglomerate resulting in process upsets. This invention eliminates such problems.

Because polyester pellets entering the crystallizer in a continuous process have been preheated to near the sticking temperature, they can be heated in the crystallizer to the crystallization temperature and crystallized much more quickly. This leads to a shorter polymer sticky stage and more uniform pellet temperature and crystallinity, and hence a more stable and efficient process.

Since the devolatilizer can provide up to 50% of the total heat requirement for the entire crystallization process, the size of the expansive crystallizer can be reduced by up to 50% resulting in a significant capital saving. Furthermore, the operating cost can be reduced by using part of the exhaust hot air from the crystallizer to heat the devolatilizer.

Variations in the present invention are possible in light of the descriptions of it provided herein. It is, therefore, to be understood that changes can be made in the particular embodiments described which will be within the full intended scope of the invention as defined by the following appended claims.

What is claimed is:

1. A process for crystallizing amorphous polyethylene naphthalate prepolymer which comprises: (1) heating the amorphous polyethylene naphthalate prepolymer to a temperature which is within the range of about 80° C. to about 140° C. in the presence of a stream of an inert gas or under a vacuum for a period of time which is sufficient to devolatilize the amorphous polyethylene naphthalate prepolymer; and (2) subsequently heating the devolatilized polyethylene naphthalate prepolymer to a temperature which is within the range of about 150° C. to about 260° C. while providing agitation to produce the crystallized polyethylene naphthalate prepolymer.

2. A process for solid state polymerizing polyethylene naphthalate prepolymer into high molecular weight polyethylene naphthalate resin comprising: (1) devolatilizing the polyethylene naphthalate prepolymer at a temperature which is within the range of about 80° C. to about 140° C. in the presence of a stream of an inert gas or under a vacuum; (2) crystallizing the devolatilized polyethylene naphthalate prepolymer by heating it to a temperature which is within the range of about 150° C. to about 260° C. while providing agitation: and (3) subsequently heating the crystallized polyethylene naphthalate prepolymer to a temperature from about 50° C. to about 1° C. below its sticking temperature for a period of time sufficient to produce the high molecular polyethylene naphthalate resin.

3. A process as specified in claim 1 wherein said amorphous polyethylene naphthalate prepolymer is prepared by the melt polymerization of ethylene glycol and 2,6-naphthalene dicarboxylic acid.

4. A process as specified in claim 2 wherein the polyethylene naphthalate prepolymer is prepared by the melt polymerization of ethylene glycol and 2,6-naphthalene dicarboxylic acid.

5. A process as specified in claim 1 wherein the amorphous polyethylene naphthalate prepolymer is a polyethylene naphthalate homopolymer.

6. A process as specified in claim 2 wherein the polyethylene naphthalate prepolymer is a polyethylene naphthalate homopolymer.

7. A process as specified in claim 1 wherein the amorphous polyethylene naphthalate prepolymer is heated to a temperature within the range of about 115° C. to about 137° C. and wherein the devolatilized polyethylene naphthalate prepolymer is heated at a temperature within the range of about 180° C. to about 220° C.

8. A process as specified in claim 2 wherein the devolatilization is conducted at a temperature which is within the range of about 115° C. to about 137° C. and wherein the crystallization is conducted at a temperature which is within the range of about 180° C. to about 220° C.

9. A process as specified in claim 1 wherein the amorphous polyethylene naphthalate prepolymer is heated to a temperature which is within the range of about 120° C. to about 135° C. and wherein the crystallization step is conducted at a temperature which is within the range of about 190° C. to about 200° C.

10. A process as specified in claim 2 wherein the devolatilization is conducted at a temperature which is within the range of about 120° C. to about 135° C. and wherein the crystallization step is conducted at a temperature which is within the range of about 190° C. to about 200° C.

11. A process as specified in claim 1 wherein the amorphous polyethylene naphthalate prepolymer is heated in the presence of an inert gas.

12. A process as specified in claim 11 wherein the inert gas is air.

13. A process as specified in claim 1 wherein the devolatilization is conducted by heating the amorphous polyethylene naphthalate prepolymer in a fluidized bed.

14. A process as specified in claim 2 wherein the solid state polymerization is conducted in a cylindrical polymerization reactor; wherein the polyethylene naphthalate polymer moves from the top to the bottom of the reactor by reason of the force of gravity in a partially dammed state; and wherein nitrogen gas flows countercurrently through the reactor.

15. A process as specified in claim 8 wherein the crystallized polyethylene naphthalate prepolymer is solid state polymerized in step (3) at a temperature which is within the range of about 210° C. to about 265° C.

16. A process as specified in claim 8 wherein the crystallized polyethylene naphthalate prepolymer is solid state polymerized in step (3) at a temperature which is within the range of about 230° C. to about 265° C.

17. A process as specified in claim 8 wherein the crystallized polyethylene naphthalate prepolymer is solid state polymerized in step (3) at a temperature which is within the range of about 240° C. to about 260° C.

18. A process as specified in claim 1 wherein the time required in step (1) to devolatilize the amorphous polyethylene naphthalate prepolymer is within the range of 15 minutes to 10 hours.

19. A process as specified in claim 18 wherein the time required in step (2) to crystallize the devolatilized polyethylene naphthalate prepolymer is within the range of about 1 minute to about 4 hours.

* * * * *